United States Patent [19]

Masler, III: William F. et al.

[11] Patent Number: 4,762,621

[45] Date of Patent: Aug. 9, 1988

[54] ITACONATE ESTER COPOLYMERS AS SCALE INHIBITORS

[75] Inventors: Masler, III: William F., Hinckley; Zahid Amjad, Avon Lake, both of Ohio

[73] Assignee: The B. F. Goodrich Company, Akron, Ohio

[21] Appl. No.: 929,973

[22] Filed: Nov. 13, 1986

[51] Int. Cl.$^4$ ............................................. C02F 5/10
[52] U.S. Cl. .................................... 210/701; 252/180
[58] Field of Search ......................... 210/698–701; 252/180, 181

[56] References Cited

U.S. PATENT DOCUMENTS 3,405,060 10/1968 Carter et al. ..................... 210/698
3,898,037 8/1975 Lange et al. ..................... 210/701

FOREIGN PATENT DOCUMENTS 0079165 5/1983 European Pat. Off. ............ 252/180
0090574 10/1983 European Pat. Off. ............ 252/180
0125519 11/1984 European Pat. Off. ............ 210/701

Primary Examiner—Peter Hruskoci
Attorney, Agent, or Firm—George A. Kap; Alan A. Csontos

[57] ABSTRACT

Copolymers of an acrylic acid and a lower alkyl ester of itaconic acid are added to an aqueous medium as scale inhibitors and as dispersants of particulate matter. In a preferred embodiment, the copolymers are composed of 70 to 95 weight parts of an acrylic acid and 5 to 30 weight parts of a lower alkyl ester of itaconic acid and the copolymers are added to the aqueous medium amount of about 1 to 200 ppm.

18 Claims, No Drawings

ITACONATE ESTER COPOLYMERS AS SCALE INHIBITORS

BACKGROUND OF THE INVENTION

Most industrial waters contain alkaline earth metal cations such as calcium, barium, magnesium, iron, manganese, zinc, etc., and several anions such as bicarbonate, carbonate, sulfate, phosphate, silicate, fluoride, etc. When combinations of these anions and cations are present in concentrations which exceed the solubility of their reaction products, precipitates form until these product solubility concentrations are no longer exceeded. For example, when the ionic product of calcium and carbonate exceeds the solubility of the calcium carbonate, a solid phase of calcium carbonate will form.

Solubility product concentrations are exceeded for various reasons such as partial evaporation of the water phase, change in pH, pressure or temperature, and the introduction of additional ions which form insoluble compounds with the ions already present in the solution.

As these reaction products precipitate on surfaces of the water carrying system, they form scale or deposits. This accumulation prevents effective heat transfer, interferes with fluid flow, facilitates corrosive processes, and harbors bacteria. This scale is an expensive problem in many industrial water systems, such as recirculating cooling water systems in cooling towers, in that the scale causes delays and shutdowns for cleaning and removal of the scale.

Fouling of heat transfer systems in industrial water systems and fouling of semipermeable membranes in reverse osmosis systems by mineral scales is a constant threat to the efficient operation of such systems. Examples of mineral scales contemplated herein include calcium carbonate, calcium sulfate, calcium phosphate, iron oxides, iron silicates and the like, whereas examples of industrial water systems include cooling and boiler water, desalination, oil production and the like. The various types of scale control agents in such systems include sodium hexametaphosphate, phosphonates, polyacrylates, copolymers of acrylic acid and methacrylic acid, copolymers of acrylic acid and acrylamide, and the like.

It is known that trace amounts of soluble iron when present in a water system can give rise to the formation of insoluble iron oxide and/or iron silicate scale and can adversely affect the performance of scale control agents. Soluble iron, which is present in the feed water, can be stabilized by the use of chelating agents such as citric acid and gluconic acid but such chemicals are not good scale control agents.

SUMMARY OF THE INVENTION

This invention pertains to the use of a copolymer of an acrylic acid and an alkyl ester of itaconic acid for scale inhibition in the presence or absence of soluble metal irons and for dispersing particulate matter. The copolymer described herein is particularly effective against calcium phosphate, calcium carbonate, calcium sulfate, and magnesium hydroxide in the presence or the absence of soluble iron. The copolymer is also effective as a dispersant for such particulate matter as iron oxides, clay, and silt. The copolymer is also effective in stabilizing soluble iron in solution so that it does not precipitate out.

DETAILED DESCRIPTION OF THE INVENTION

This invention relates to a method for dispersing and maintaining dispersed particulate matter in an aqueous medium containing such matter and/or for controlling the deposition of scale-imparting precipitates on surfaces of equipment used in recirculating or the once-through water systems containing such precipitates, or precipitate-forming ions, under conditions which form the precipitates. The method comprises the step of adding to preferably neutral or alkaline water a small amount, i.e., in the range from about 1 part per million (ppm) to about 200 ppm, of a copolymer defined herein to inhibit deposition of the precipitates, particularly those selected from calcium phosphate, calcium carbonate, calcium sulfate, barium sulfate, magnesium phosphate, magnesium hydroxide, calcium silicate, magnesium silicate, iron oxides, zinc hydroxide, zinc phosphate, calcium fluoride, calcium oxalate, and mixtures thereof. The copolymers are effective scale inhibitors in the presence or the absence of soluble iron and are also effective in maintaining such iron solubilized in solution. Amount of the iron, if present, is generally from about 1 to about 5 ppm in the aqueous medium. Amount of the soluble ions can be in the range of 1 to 20 ppm.

The invention described herein is particularly directed to threshold inhibition in typical cooling water process streams. However, other process water streams which contain concentrations of ions far in excess of typical cooling water streams may also be effectively treated for scale inhibition with the copolymers of our invention in concentrations from about 1 ppm to about 200 ppm, and in some instances as high as 500 ppm, where the cost is justified. Such other process water streams include brine solutions such as are processed in desalination plants, particularly in the multiple evaporators thereof; and in brackish waters containing a high concentration of salts such as are typically encountered in membrane devices for reverse osmosis processes. Still other process water uses are in various oil field applications for scale inhibition in conduits circulating saline and oily water, where the water is present in a major amount by weight, most particularly in secondary oil recovery operations.

In accordance with the invention described herein, it has been discovered that copolymers of a monounsaturated monocarboxylic acid of 3 to 8 carbon atoms and an alkyl ester of itaconic acid containing 1 to 12 carbon atoms in the alkyl group are effective in water systems to reduce or inhibit formation and deposition of scale in the presence or absence of soluble iron.

These copolymers have molecular weight in the range of about 1,000 to 50,000, preferably about 2,000 to 20,000. The molecular weight given herein is weight average molecular weight (Mw), as measured by gel permeation chromatography. In a preferred embodiment, suitable copolymers are prepared by polymerizing 60 to 99 weight parts of an acrylic acid and 1 to 40 weight parts of a lower alkyl ester of itaconic acid. In an especially preferred embodiment, the copolymers are prepared by polymerizing 70 to 95 weight parts of an acrylic acid and 5 to 30 weight parts of a lower alkyl ester of itaconic acid, the amounts being based on a total of 100 weight parts of the comonomers.

In a preferred embodiment, the copolymers suitable herein are random polymers containing polymerized units of an acrylic acid and polymerized units of a lower-alkyl ester of itaconic ester as represented by the following structural formula I:

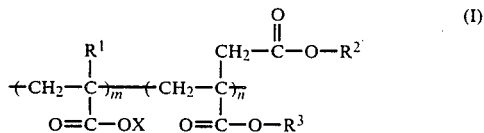

where m and n are such that the weight ratio of the acrylic acid to the itaconate ester is in the range from about 50 to 99 weight parts of the acrylic acid to about 50 to 1 weight parts of the itaconate ester, subject to the molecular weight limitations; $R^1$ is selected from hydrogen and methyl; X is selected from hydrogen, alkali metals, alkaline earth metals and ammonium, particularly hydrogen, sodium, potassium, calcium, ammonium and magnesium; and $R^2$ and $R^3$ are individually selected from hydrogen, alkyl and substituted alkyl groups containing 1 to 12 carbon atoms in the alkyl groups, provided that both $R^2$ and $R^3$ are not hydrogen although either $R^2$ or $R^3$ can be hydrogen. Substituents on the $R^2$ and $R^3$ groups include lower alkyl, aryl such as phenyl, and keto groups, however, in a preferred embodiment, $R^2$ and $R^3$ are individually selected from unsubstituted lower alkyl groups of 1 to 6 carbon atoms.

Specific examples of preferred $R^2$ and $R^3$ groups include methyl, ethyl, propyl, isopropyl, butyl and isomeric forms thereof, and the like. Preferred herein are the diesters of itaconic acid. Specific examples of preferred itaconic acid esters include dimethyl itaconate, diethyl itaconate and dibutyl itaconate.

Suitable acrylic acids for purposes herein are generally defined as monounsaturated monocarboxylic acids containing 3 to 8, preferably 3 to 4 carbon atoms. Specific examples of preferred acids are acrylic acid and methacrylic acid. One or both of these acids can be used to prepare copolymers with one or more lower alkyl esters of itaconic acid.

The acrylic or methacrylic acid units in the copolymer can be in the acid form or in a neutralized form where the hydrogen of the carboxyl group is replaced with an alkali metal, alkaline earth metal, or an ammonium cation, depending on the neutralizing medium. Generally, the copolymers can be neutralized with a strong alkali, such as sodium hydroxide, in which instance, the hydrogen of the carboxyl group of the acrylic acid units will be replaced with a sodium. With the use of an amine neutralizing agent, the hydrogen will be replaced with an ammonium group. Useful copolymers include copolymers that are unneutralized, partially neutralized, and completely neutralized.

The monomers can be prepared, if desired, in a conventional manner but they are commercially available and therefore, can be purchased. Polymerization of the monomers results in an essentially non-crosslinked random copolymer, the molecular weight of which can be adjusted with a little trial and error. The copolymer is preferably formed in a high yield ranging from about 50% to about 99% by weight of the comonomers.

It is also a requirement that the copolymer be soluble in water. Typically, the copolymer is used in water in the range of 0.05 to 500 ppm. Thus, high solubility of water treatment compositions is not essential but desirable. The product is preferably shipped in drums as a concentrated aqueous solution containing in the range of about 20% to about 50% by weight of solids per 100 parts of solution, which requires solubility to the extent of at least 20 weight parts per 100 parts of water.

Polymerization of the monomers identified herein can be carried out in a mutual solvent for both, such as in a hydrocarbon solvent, whether aliphatic or aromatic, in a lower alkanol of about 1 to 6 carbon atoms, or in a ketone or an ester solvent, or in water, with an effective amount of a free radical initiator sufficient to produce the desired composition within an acceptable period of time.

The copolymer may be formed in an acyclic ketone, such as acetone, or in an acyclic ester, such as ethyl acetate, an alkanol, or in xylene or toluene. If, for example, the copolymer is formed in an organic solvent, or a mixture of an organic solvent and water, the copolymer is converted from the organic solvent solution to a water solution. Typically, the organic solvent is stripped from the solution with steam, or distilled off with subsequent additions of water and repetition of distillation to remove the solvent, followed by the addition of water and a neutralizing agent such as caustic solution, ammonia, a hydrazine, or a low-boiling primary, secondary or tertiary aliphatic amine.

The final aqueous solution of polymer salt is preferably in the range of about pH 2 to about pH 8, with a total solids content of about 2 to about 60% by weight, and preferably about 5 to about 50% by weight of polymer in water.

The copolymers formed may have weight average molecular weight in the range of about 1,000 to about 50,000, and preferably about 2,000 to about 20,000 as determined by gel permeation chromatography. This determination is conventionally made according to ASTM method D-3536-76 (see ASTM Standards, Part 35, 1980), by dissolving the esterified copolymer in tetrahydrofuran and comparing with a solution in THF of polystyrene of known molecular weight. The acid numbers of the copolymers formed, as determined by a conventional titration with KOH, may range from about 310 to about 740, corresponding to a weight fraction of from 40% to about 95% by weight of monomer units having COOH groups. The preferred polymers have more than 50% by weight of free carboxyl groups and an acid number in the range from about 390 to about 700.

In a typical polymerization process, a glass lined or stainless steel jacketed reactor is charged with predetermined amounts of monomers along with the polymerization catalyst and solvent under a nitrogen blanket, and the reaction mixture is allowed to exotherm under controlled temperature conditions maintained by a heat-transfer fluid in the jacket of the reactor. The pressure under which the reaction occurs is not critical, it being convenient to carry it out under atmospheric pressure.

The copolymers described herein in connection with threshold inhibition of salt-forming scales and dispersion of particulate matter can be used in combination with other conventional additives wherever appropriate. Examples of some of the conventional additives include anti-precipitating agents, oxygen scavengers, sequestering agents, corrosion inhibitors, antifoaming agents, and the like.

The copolymers formed in the manner described herein were used to treat water which contained calcium ions and phosphate ions in a stirred pH-STAT test while maintaining constant pH and using an automatic tritrator to gauge the effectiveness of the polymer for inhibiting the formation and deposition of calcium phosphate. The test was carried out as follows: a known volume of a phosphate salt solution, such as $Na_2HPO_4$ or another soluble phosphate salt solution, was transferred to a known volume of distilled water in a double-walled glass cell to give a final concentration of 9–10 ppm of orthophosphate ions. To this solution was added slowly and with continuous stirring a known volume of test polymer solution sufficient to give a dosage of 10 ppm.

A pair of glass and reference electrodes, which were calibrated before and after each experiment with standard buffer solutions of pH 7.00 and 9.00, was then immersed in the solution which was maintained at 50° C. by circulating water through the outside of a glass cell jacket. After about 45 minutes, a known volume of calcium chloride solution was slowly added to the continuously stirred solution containing phosphate and polymer, to give a final calcium ion concentration of 140 ppm. The pH of the solution was then immediately brought to pH 8.50 by automatic addition of 0.10M NaOH solution. The pH of the solution was then maintained at 8.50±0.01 throughout the experiment using the pH stat technique.

Solution samples were withdrawn after 22 hours and analyzed after filtration through 0.22 micrometer filter paper, for orthophosphate ions using the ascorbic acid method, as described in detail in "Standard Methods for the Examination of Water and Waste Water", 14th edition, prepared and published jointly by American Health Association, et al. The instrument used for the colorimetric measurements was a Beckman 5270 Spectrophotometer.

Tests for calcium sulfate and calcium carbonate were carried out by the method of Ralston, see J. Pet. Tech., August, 1969, 1029–1036.

The percent threshold inhibition (TI) attained for each experiment was obtained using the following formula, shown in this case for calcium phosphate:

$$\% TI = \frac{(PO_4)exp - (PO_4)final}{(PO_4)initial - (PO_4)final} \times 100$$

where
($PO_4$) exp=concentration of phosphate ion in the filtrate in presence of the copolymer at time 22 hours
($PO_4$) final=concentration of phosphate ion in filtrate in absence of the copolymer at time 22 hours
($PO_4$) initial=concentration of phosphate ion at time zero The invention disclosed herein is demonstrated by the following examples which show preparation of the copolymers and threshold inhibition tests thereof and other related polymers.

EXAMPLE 1

This example demonstrates conventional preparation of certain copolymers and homopolymers in isopropanol solvent in the weight ratio and molecular weight (Mw) indicated in Table I, below:

The polymers were prepared by metering into 150 parts of refluxing isopropanol in a reactor over a period of 2 hours, 100 parts of a mixture of acrylic acid and the itaconate ester as well as 3 parts of a 75% solution in mineral spirits of t-butyl peroxypivalate.

After completing the metering operation, the mixture was heated in a reactor at reflux temperature for 1 hour to ensure complete polymerization. The solution was steam-stripped to remove solvent and was diluted with water to give a clear polymer solution.

EXAMPLE 2

This example demonstrates threshold inhibition of various polymers on calcium phosphate, calcium carbonate and calcium sulfate in the presence of the polymer. The tests were carried out in the manner described above to determine percent threshold inhibition using the various polymers. Results of the tests are given in Table 1 below.

TABLE 1

| Composition | Wt. Ratio | MW | % Threshold Inhibition | | |
|---|---|---|---|---|---|
| | | | $Ca/PO_4^{(a)}$ | $CaCO_3^{(b)}$ | $CaSO_4^{(c)}$ |
| AA:DMI | 80:20 | 6,000 | 86(63) | 81 | 55 |
| AA:DMI | 80:20 | 10,000 | 90(70) | 78 | 53 |
| AA:DMI | 70:30 | 10,000 | 89(80) | 67 | 43 |
| AA:DMI | 60:40 | 10,000 | 64(72) | 61 | 31 |
| AA:DEI | 80:20 | 10,000 | 40(21) | 82 | 45 |
| AA:DEI | 70:30 | 10,000 | 58(30) | 79 | 41 |
| AA:IA | 80:20 | 5,000 | 12 — | 70 | 17 |
| AA:IA | 50:50 | 5,000 | 0 | 48 | 22 |
| AA | 100 | 10,000 | 1 — | — | — |
| AA | 100 | 5,000 | 14 — | 84 | 77 |

$^{(a)}$Conditions: Ca = 140 ppm, $PO_4$ = 9.2 ppm, pH = 8.5, T = 50° C., Time = 22 hrs., Polymer = 10 ppm
$^{(b)}$Conditions: Ca = 224 ppm, $HCO_3$ = 760 ppm, $CO_3$ = 18 ppm, T = 67° C., Time = 24 hrs., Polymer = 3 ppm
$^{(c)}$Conditions: Ca = 2000 ppm, $SO_4$ = 4800 ppm, T = 67° C., Time = 24 hrs., Polymer = 2 ppm In the above table, the following contractions are used:
AA—acrylic acid
DMI—dimethyl itaconate
MAA—methacrylic acid
IA—itaconic acid
DEI—diethyl itaconate The above Table I shows the use of various copolymers of acrylic acid with itaconate esters as scale inhibitors. Weight average molecular weight of the copolymers is indicated. Threshold inhibition of calcium phosphate with the 80:20 copolymer of acrylic acid and dimethyl itaconate was 86%. TI for the other scales is given in Table I, above. The figure given in parenthesis is calcium phosphate threshold inhibition by the copolymer in amount of 10 ppm in the presence of 1 ppm of soluble iron (III). In this instance, the copolymer of acrylic acid and dimethyl itaconate yielded calcium phosphate inhibition of 63% in the presence of 1 ppm of the soluble iron.

Threshold inhibition of calcium phosphate in absence of soluble iron should be in excess of about 60%, preferably in excess of 80%. Soluble iron interferes with threshold inhibition and results in its presence are lower, as indicated by the tests summarized in the above table.

Several comparison tests were also run to demonstrate relative effectiveness against calcium phosphate. The results in Table I show that the 80/20 copolymer of acrylic acid and itaconic acid had threshold inhibition of only 12%. The 50/50 copolymer of acrylic acid and itaconic acid had a disastrous threshold inhibition of 1%.

EXAMPLE 3

This example demonstrates effectiveness of the copolymers disclosed herein as dispersants for iron oxide particulate matter in water.

Dispersant activity was measured as a function of time for a particular concentration of polymeric dispersant which was to be tested as a dilute solution in water. In this test, 0.12 g of iron oxide was added to a 800 ml beaker containing 600 ml of synthetic water and polymer solution at the test concentration. Synthetic water used herein had the following composition:

Ca=100 ppm
Na=314 ppm
$SO_4$=200 ppm
Mg=30 ppm
Cl=571 ppm
$HCO_3$=60 ppm

The polymer was present at a level of 1 ppm.

The slurries was stirred using 6 paddle stirrer and % transmittance (T) determined at known time using a Brinkmann PC-1000 colorimeter. Dispersancy was measured as a function of amount of iron oxide dispersed. The performance of the polymers was determined by comparing % T values of the slurries containing polymer against control with no polymer. Greater dispersancy was, therefore, indicated by lower % T value which means that the lower % T numbers indicated greater polymer effectiveness. Percent transmittance values are summarized in Table 2 below where approximate molecular weight is given.

TABLE 2

| COMPOSITION | WT. RATIO | MW | % TRANSMITTANCE |
|---|---|---|---|
| — | — | — | 89 |
| AA:DMI | 80:20 | 6,000 | 34 |
| AA:DMI | 80:20 | 10,000 | 36 |
| AA:DMI | 70:30 | 10,000 | 30 |
| AA:DMI | 60:40 | 10,000 | 26 |
| AA:DEI | 80:20 | 10,000 | 32 |
| AA:DEI | 70:30 | 10,000 | 21 |
| AA:IA | 80:20 | 5,000 | 71 |
| AA:IA | 50:50 | 5,000 | 67 |
| AA | 100 | 10,000 | 64 |
| AA | 100 | 5,100 | 54 |

EXAMPLE 4

Many different copolymers were tested to determine their ability to stabilize iron (III) and zinc (II) in aqueous solutions. Aqueous solutions were prepared containing the following ions in amounts indicated.

| | Fe (III) | Zn (II) |
|---|---|---|
| Ca = | 300 ppm | 60 ppm |
| Mg = | 296 ppm | 20 ppm |
| Na = | 1113 ppm | 202 ppm |
| Cl = | 2170 ppm | 172 ppm |
| $SO_4$ = | 700 ppm | 200 ppm |
| $HCO_3$ = | 98 ppm | 36 ppm |
| Iron (III) = | 1.0 ppm | -0- |
| Zn (II) = | -0- | 6.0 |
| pH = | 7.0 | 8.5 |
| Temp, °C. = | 22 | 30 |
| Time, hours = | 2.0 | 22.0 |
| Polymer Dosage = | 2.0 ppm | 4.5 ppm |

Static test conditions were employed. After completion of the tests, amounts of iron and zinc in solution were determined by atomic absorption. The effectiveness of the polymers tested against soluble iron and zinc are given in Table 3 below in terms of percent stabilization, with approximate weight average molecular weight given for the copolymers:

TABLE 3

| COMPOSITION | WT. RATIO | MW | % STABILIZATION Fe (III)[a] | % STABILIZATION Zn (II)[b] |
|---|---|---|---|---|
| AA:DMI | 80:20 | 6,000 | 91 | 80 |
| AA:DMI | 80:20 | 10,000 | 75 | 56 |
| AA:DMI | 70:30 | 10,000 | 51 | 23 |
| AA:DMI | 60:40 | 10,000 | 6 | 20 |
| AA:DEI | 80:20 | 10,000 | 36 | 22 |
| AA:DEI | 70:30 | 10,000 | 29 | 47 |
| AA:IA | 80:20 | 5,000 | 5 | 21 |
| AA:IA | 50:50 | 5,000 | 6 | 14 |
| AA | 100 | 10,000 | 5 | 5 |
| AA | 100 | 5,100 | 1 | 20 |

As already noted, the copolymers disclosed herein are effective as scale inhibitors against calcium carbonate, calcium sulfate, and calcium phosphate and as dispersants against particulates such as iron oxide, clay, silt, and other suspended particulate matter. Also, the herein-disclosed copolymers are effective in stabilizing metal ions, such as iron, zinc and manganese, and their reaction products. Furthermore, the herein-disclosed copolymers are effective scale inhibitors in the presence of solubilized metal ions.

We claim:

1. A method for inhibiting precipitation of scale, including calcium phosphate, in an aqueous medium comprising the step of adding to the aqueous medium at least an effective amount of a copolymer of 50 to 95 weight parts of acrylic acid or methacrylic acid and salts thereof and 50 to 5 weight parts of at least one dialkyl ester of itaconic acid containing 1 to 4 carbon atoms in each of the two alkyl groups, based on the total weight of 100 weight parts of said acid and said ester, wherein said copolymer is water-soluble, crosslinked random copolymer having weight average molecular weight of about 1,000 to 50,000.

2. Method of claim 1 wherein the amount of said copolymer used in said aqueous medium is 0.1 to 200 ppm.

3. Method of claim 2 wherein said copolymer contains polymerized units of an acrylic acid and an alkyl ester of itaconic acid said copolymer being defined by the following formula:

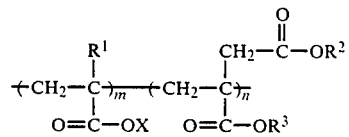

where m and n are such that the weight ratio of the acrylic acid to the itaconate ester is in the range from about 50 to 95 weight parts of the acrylic acid to about 50 to 5 weight parts of the itaconate ester, subject to the molecular weight limitation; $R^1$ is selected from hydrogen and methyl; X is selected from hydrogen, alkali metals, alkaline earth metals, and ammonium; and $R^2$ and $R^3$ are individually selected from alkyl groups containing 1 to 4 carbon atoms in each of the alkyl groups.

4. Method of claim 3 wherein the amount of said copolymer is 1 to 100 ppm.

5. Method of claim 4 wherein the alkyl ester of itaconic acid is selected from dimethyl itaconate, diethyl itaconate, and dibutyl itaconate.

6. Method of claim 1 wherein there are present soluble metal ions in said aqueous medium.

7. Method of claim 6 wherein said copolymer contains polymerized units of an acrylic acid and an alkyl ester of itaconic acid, said copolymer being defined by the following formula:

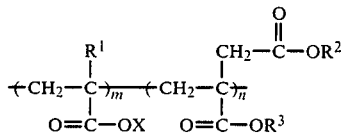

where m and n are such that the weight ratio of the acrylic acid to the itaconate ester is in the range from about 50 to 95 weight parts of the acrylic acid to about 50 to 5 weight parts of the itaconate ester, subject to the molecular weight limitation; $R^1$ is selected from hydrogen and methyl; X is selected from hydrogen, alkali metals, alkaline earth metals, and ammonium; and $R^2$ and $R^3$ are individually selected from alkyl groups containing 1 to 4 carbon atoms in each of the alkyl groups.

8. Method of claim 7 wherein the amount of said copolymer is 1 to 100 ppm.

9. Method of claim 8 wherein said metal ions are soluble iron, manganese, zinc, or mixtures of such ions which are present in said aqueous medium in amount of about 1 to 20 ppm.

10. Method of claim 9 wherein said aqueous medium is selected from process waters used in a steam generating system, a recirculating cooling water system, a gas scrubbing system, a desalination water system, and a crude petroleum recovery system.

11. Method of claim 7 wherein said scale further includes calcium carbonate, calcium sulfate, magnesium hydroxide, iron oxides, or mixtures thereof.

12. Method of claim 11 wherein said copolymer is composed of 70 to 95 weight parts of an acrylic acid and 5 to 30 weight parts of alkyl ester of itaconic ester, on the relative basis of said acid to said ester.

13. Method of claim 12 wherein said copolymer is composed of 80 weight parts of acrylic acid itself and 20 weight parts of dimethyl itaconate, wherein weight average molecular weight of said copolymer is about 6,000.

14. Method of claim 13 wherein amount of said copolymer in said aqueous medium is about 10 ppm.

15. Method for dispersing particulate matter, including iron oxide, in a system containing an aqueous medium comprising the step of adding to said aqueous medium at least an effective amount of a copolymer of 50 to 95 weight parts of acrylic acid or methacrylic acid and salts thereof and 50 to 5 weight parts of at least one dialkyl ester of itaconic acid containing 1 to 4 carbon atoms in each of the two alkyl groups, based on the total of 100 weight parts of said acid and said ester, said copolymer is water-soluble, crosslinked random copolymer having weight average molecular weight of about 1,000 to 50,000.

16. Method of claim 15 wherein said copolymer is used in said aqueous medium in amount of 1 to 200 ppm.

17. Method of claim 16 where said copolymer contains polymerized units of an acrylic acid and an alkyl ester of itaconic acid, said copolymer being defined by the following formula:

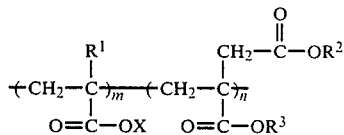

where m and n are such that the weight ratio of the acrylic acid to the itaconate ester is in the range from about 50 to 95 weight parts of the acrylic acid to about 50 to 5 weight parts of the itaconate ester, subject to the molecular weight limitation; $R^1$ is selected from hydrogen and methyl; X is selected from hydrogen, alkali metals, alkaline earth metals, and ammonium; and $R^2$ and $R^3$ are individually selected from alkyl groups containing 1 to 4 carbon atoms in each of the alkyl groups.

18. Method of claim 17 wherein the amount of said copolymer is 1 to 100 ppm, and wherein the alkyl ester of itaconic acid is selected from dimethyl itaconate, diethyl itaconate, and dibutyl itaconate.

* * * * *